United States Patent
Katz et al.

(10) Patent No.: US 10,401,967 B2
(45) Date of Patent: Sep. 3, 2019

(54) TOUCH FREE INTERFACE FOR AUGMENTED REALITY SYSTEMS

(71) Applicant: Eyesight Mobile Technologies, LTD., Herzliya (IL)

(72) Inventors: Itay Katz, Tel Aviv (IL); Amnon Shenfeld, Tel Aviv (IL)

(73) Assignee: Eyesight Mobile Technologies, Ltd., Herzliya (IL)

( * ) Notice: Subject to any disclaimer, the term of this patent is extended or adjusted under 35 U.S.C. 154(b) by 0 days.

(21) Appl. No.: 15/144,209

(22) Filed: May 2, 2016

(65) Prior Publication Data
US 2016/0320855 A1   Nov. 3, 2016

Related U.S. Application Data

(63) Continuation of application No. 14/345,592, filed as application No. PCT/IL2012/050376 on Sep. 19, 2012, now abandoned.
(Continued)

(51) Int. Cl.
*G06F 3/01* (2006.01)
*G02B 27/01* (2006.01)
(Continued)

(52) U.S. Cl.
CPC ......... *G06F 3/017* (2013.01); *G02B 27/0172* (2013.01); *G06F 3/011* (2013.01);
(Continued)

(58) Field of Classification Search
CPC ........ G02B 2027/0178; G02B 27/0172; G06F 3/011; G06F 3/012; G06F 3/017;
(Continued)

(56) References Cited

U.S. PATENT DOCUMENTS

| 8,971,565 B2 | 3/2015 | Anzola |
| 2002/0060648 A1 | 5/2002 | Matsui et al. |

(Continued)

FOREIGN PATENT DOCUMENTS

| CN | 101430601 A | 5/2009 |
| CN | 101667098 A | 3/2010 |

(Continued)

OTHER PUBLICATIONS

International Search Report for PCT International Application No. PCT/IL2012/050376, dated Jan. 24, 2013 (3 pages).
(Continued)

*Primary Examiner* — Afroza Chowdhury
(74) *Attorney, Agent, or Firm* — Finnegan, Henderson, Farabow, Garrett & Dunner LLP (57) ABSTRACT

A method and system for augmented reality. Images of a real world scene are obtained from one or more from one or more image sensors. An orientation and/or location of the image sensors is obtained item one or more state sensors. A real world object at which a predefined pointing object is performing a predefined gesture in the images of the real world scene is identified and data associated with the identified object is displayed on a viewing device. The invention also provides a computer program comprising computer program code means for performing all the steps of the method of the invention when said program is run on a computer.

18 Claims, 5 Drawing Sheets

Related U.S. Application Data (60) Provisional application No. 61/536,144, filed on Sep. 19, 2011.

(51) Int. Cl.

| | | |
|---|---|---|
| *G06T 7/00* | (2017.01) | |
| *G06T 19/00* | (2011.01) | |
| *G06F 3/03* | (2006.01) | |
| *G06F 3/0481* | (2013.01) | |
| *G06F 3/0484* | (2013.01) | |
| *H04N 5/232* | (2006.01) | |
| *G06T 7/70* | (2017.01) | |

(52) U.S. Cl.
CPC .............. *G06F 3/012* (2013.01); *G06F 3/016* (2013.01); *G06F 3/0304* (2013.01); *G06F 3/04817* (2013.01); *G06F 3/04842* (2013.01); *G06T 7/70* (2017.01); *G06T 19/006* (2013.01); *H04N 5/23245* (2013.01); *G02B 2027/014* (2013.01); *G02B 2027/0138* (2013.01); *G02B 2027/0178* (2013.01); *G02B 2027/0187* (2013.01); *G06T 2200/24* (2013.01)

(58) Field of Classification Search
CPC ............... G06F 3/0304; G06F 3/04817; G06F 3/04842; G06T 19/006; G06T 2200/24; H04N 5/23245
See application file for complete search history.

(56) References Cited

U.S. PATENT DOCUMENTS

| | | |
|---|---|---|
| 2003/0156756 A1 | 8/2003 | Gokturk et al. |
| 2006/0101349 A1 | 5/2006 | Lieberman et al. |
| 2006/0209021 A1* | 9/2006 | Yoo .................... G06F 3/017 345/156 |
| 2008/0186255 A1 | 8/2008 | Cohen et al. |
| 2009/0147991 A1 | 6/2009 | Chau |
| 2010/0177035 A1 | 7/2010 | Schowengerdt et al. |
| 2010/0302015 A1 | 12/2010 | Kipman et al. |
| 2011/0029185 A1 | 2/2011 | Aoki et al. |
| 2011/0102570 A1* | 5/2011 | Wilf .................... G06F 3/017 348/77 |
| 2011/0107216 A1 | 5/2011 | Bi |
| 2011/0213664 A1 | 9/2011 | Osterhout et al. |
| 2011/0221669 A1 | 9/2011 | Shams et al. |
| 2011/0296163 A1 | 12/2011 | Abernathy et al. |
| 2012/0019662 A1 | 1/2012 | Maltz |
| 2012/0032874 A1 | 2/2012 | Mukawa |
| 2012/0062602 A1 | 3/2012 | Vadhavana et al. |
| 2012/0093360 A1* | 4/2012 | Subramanian ..... G06K 9/00201 382/103 |
| 2013/0050069 A1* | 2/2013 | Ota .................... G06F 3/011 345/156 |
| 2014/0375547 A1 | 12/2014 | Katz et al. |
| 2016/0259423 A1 | 9/2016 | Katz et al. |

FOREIGN PATENT DOCUMENTS

| | | |
|---|---|---|
| CN | 102147926 A | 8/2011 |
| GB | 2465280 | 5/2010 |
| JP | A-2007-115167 | 5/2007 |
| WO | WO 0169365 | 9/2001 |
| WO | WO 2009144685 | 12/2009 |

OTHER PUBLICATIONS

Chinese Office Action dated Apr. 12, 2017 for Chinese Patent Application No. 201280048836.8, entitled "Touch Free Interface for Augmented Reality Systems".

Akira Sakamoto, "Development of Cooperation System for Home Appliances using Augmented Reality", the proceedings of Multimedia, Distribution, Coordination and Mobile (DICOMO 2010) Symposium, vol. 2010 No. 1 [CD-ROM] IPSJ Symposium Series, Japan, Information Processing Society of Japan, Jul. 7, 2010, p. 374 (Well-known Art; Newly cited).

Decision of Rejection for Japanese Patent Application No. 2014-531374 from the Japanese Patent Office, dated May 24, 2017, pp. 1-3.

Third Office Action in Chinese Patent Application No. 201280048836.8 dated Sep. 20, 2017, 21 pgs.

\* cited by examiner

TOUCH FREE INTERFACE FOR AUGMENTED REALITY SYSTEMS

This application is a continuation of U.S. application Ser. No. 14/345,592, filed on Mar. 18, 2014, which is a national stage entry of PCT/IL2012/050376, filed Sep. 19, 2012, which claims the priority benefit of U.S. Provisional Application No. 61/536,144, filed on Sep. 19, 2011, all of which are incorporated herein by reference.

TECHNOLOGICAL FIELD

The present invention relates to methods and systems for augmented reality.

PRIOR ART

References considered to be relevant as background to the presently disclosed subject matter are listed below:
U.S. Pat. No. 7,126,558;
U.S. Published Patent Application 20110221669;
U.S. Published Patent Application 20110270512;
GB2465280(A);
U.S. Published Patent Application 20120068913;
U.S. Pat. No, 7,215,322;
WO2005/091125;
WO 2010/086866
Crowley, J.L. et al, Finger Tracking as an Input Device for Augmented Reality. Published in the proceedings of the International Workshop on Face and Gesture Recognition, Zurich, Switzerland, June 1995.

Acknowledgement of the above references herein is not to be inferred as meaning that these are in any way relevant to the patentability of the presently disclosed subject matter.

BACKGROUND

Augmented reality is a term for a live, direct or an indirect, view of a physical, real-world environment whose elements are augmented by computer-generated information such as text, sound, video, graphics or GPS data. Artificial information about the environment and its objects is thus overlaid on a real world view or image. Augmentation is typically in real-time and in semantic context with environmental elements so that information about the surrounding world of the user becomes active and digitally manipulatable.

The main hardware components for augmented reality a processor, display, sensors and input devices. These elements, specifically a CPU, display, camera and MEMS sensors such as accelerometer, GPS, or solid state compass are present in portable device such as smartphones, which allow them to function as augmented reality platforms.

Augmented reality systems have found applications in entrainment, navigation, assembly processes, maintenance, medical procedures. Portable augmented reality systems have also found applications in tourism and sightseeing where augmented reality is used to present information of real world objects and places objects being viewed.

An immersive augmented experience reality experience is provided using a head-mounted display, typically in the form of goggles or a helmet. With a head-mounted display, virtual visual objects are superimposed on the user's view of a real world scene. The head mounted display is tracked with sensors that allow the system to align virtual information with the physical world. The tracking may be performed, for example, using any one of such technologies as digital cameras or other optical sensors, accelerometers, GPS, gyroscopes, solid state compasses, RFID and wireless sensors. Head-mounted displays are either optical see-through or video see-through. Optical see-through employs solutions such as half-silver mirrors to pass images through the lens and overlay information to be reflected into the user's eyes, and transparent LCD projectors that display the digital information and images directly or indirectly to the user retina.

GENERAL DESCRIPTION

The present invention provides an interactive system for augmented reality. The interactive system of the invention includes a wearable data display device that may be incorporated for example, into a pair of glasses or goggles. The wearable display has a device providing location extraction capabilities (such as GPS) and a compass. The system also includes a user interface that allows a user to select computer generated data to augment a real world scene that the user is viewing. A camera obtains images of the real-world scene being viewed. A processor detects a predefined object in images of the real world scene captured by the camera such as a user's finger. When the user points to an element in the scene, data relating to the element are displayed on the data display device and are superimposed on the user's view of the scene.

Thus, in one of its aspects, the invention provides a method for augmented reality comprising:
 (a) obtaining images of a real world scene from one or more image sensors;
 (b) obtaining from one or more state sensors one or both of an orientation and a location data of the image sensors;
 (c) identifying in the images of the real world scene obtained by the image sensor or sensors a real world object at which a predefined pointing object is performing a predefined gesture, the gesture detection module utilizing data provided by the one or more state sensors; and
 (d) presenting data associated with the identified object on a display of a viewing device.

The image sensor may be selected from a camera a light sensor, an IR sensor, an ultrasonic sensor, a proximity sensor, a CMOS image sensor, a shortwave infrared (SWIR) image sensor or a reflectivity sensor, an IR sensor, an ultrasonic sensor, a proximity sensor, and a reflectivity sensor. One or more of the state sensors may be selected from an optical sensor, an accelerometer, GPS, a gyroscope, a compass, magnetic sensor, a sensor indicating direction of the device relative to the Earth's magnetic field, a gravity sensor and an RFID detector.

The data associated with the identified object may be obtained by searching in a memory for data associated with the real world object.

The predefined object may be, for example, a hand, a part of a hand, two hands, parts of two hands, a finger, part of a finger, or a finger tip.

The viewing device may be configured to be worn by a user, for example, glasses or goggles. The viewing device may be incorporated in a mobile communication device.

The step of identifying in the images of the real world scene obtained by the image sensor or sensors may comprise determining a location (X,Y) of the predefined object an image obtained by the image sensors and determining one or both of location and an orientation of the display device provided by the sensors.

The method of the invention may further comprise communicating with an external device or website. The communication may comprise sending a message to an application running on the external device, a service running on the external device, an operating system running on the external device, a process running on the external device, one or more applications running on a processor of the external device, a software program running in the background of the external device, or to one or more services running on the external device. The method may further comprise sending a message to an application running on the mobile communication device, a service running on the mobile communication device, an operating system running on the mobile communication device, a process running on the mobile communication device, one or more applications running on a processor of the mobile communication device, a software program running in the background of the mobile communication device, or to one or more services running on the mobile communication device.

The method may further comprise sending a message requesting a data relating to a real world object identified in an image from an application running on the external device, a service running on the external device, an operating system running on the external device, a process running on the external device, one or more applications running on a processor of the external device, a software program running in the background of the external device, or to one or more services running on the external device. The method may further comprise sending a message requesting a data relating to a real world object identified in an image from an application running on the mobile communication device, a service running on the mobile communication device, an operating system running on the mobile communication device, a process running on the mobile communication device, one or more applications running on a processor of the mobile communication device, a software program running in the background of the mobile communication device, or to one or more services running on the mobile communication device.

The message to the external device or website may be a command. The command may be selected from a command to run an application on the external device or website, a command to stop an application running on the external device or website, a command to activate a service running on the external device or website, a command to stop a service running on the external device or website, or a command to send data relating to a real world object identified in an image.

The message to the mobile communication device may be a command. The command may be selected from a command to run an application on the mobile communication device, a command to stop an application running on the mobile communication device or website, a command to activate a service running on the mobile communication device e, a command to stop a service running on the mobile communication device, or a command to send data relating to a real world object identified in an image.

The method may further comprise receiving from the external device or website data relating to a real world object identified in an image and presenting the received data to a user.

The communication with the external device or website may be over a communication network.

The command to the external device may be selected from depressing a virtual key displayed on a display device of the external device; rotating a selection carousel; switching between desktops, running on the external device a predefined software application; turning off an application on the external device; turning speakers on or off; turning volume up or down; locking the external device, unlocking the external device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, pointing at a map, zooming-in or out on a map or images, painting on an image, grasping an activatable icon and pulling the activatable icon out form the display device, rotating an activatable icon, emulating touch commands on the external device, performing one or more multi-touch commands, a touch gesture command, typing, clicking on a displayed video to pause or play, tagging a frame or capturing a frame from the video, presenting an incoming message; answering an incoming call, silencing or rejecting an incoming call, opening an incoming reminder; presenting a notification received from a network community service; presenting a notification generated by the external device, opening a predefined application, changing the external device from a locked mode and opening a recent call application, changing the external device from a locked mode and opening an online service application or browser, changing the external device from a locked mode and opening an email application, changing the external device from locked mode and opening an online service application or browser, changing the device from a locked mode and opening a calendar application, changing the device from a locked mode and opening a reminder application, changing the device from a locked mode and opening a predefined application set by a user, set by a manufacturer of the external device, or set by a service operator, activating an activatable icon, selecting a menu item, moving a pointer on a display, manipulating a touch free mouse, an activatable icon on a display, altering information on a display.

In the method of the invention, the predefined gesture may be selected from a swiping motion, a pinching motion of two fingers, pointing, a left to right gesture, a right to left gesture, an upwards gesture, a downwards gesture, a pushing gesture, opening a clenched fist, opening a clenched fist and moving towards the image sensor, a tapping gesture, a waving gesture, a clapping gesture, a reverse clapping gesture, closing a hand into a fist, a pinching gesture, a reverse pinching gesture, a gesture of splaying fingers on a hand, a reverse gesture of splaying fingers on a hand, pointing at an activatable icon, holding an activating object for a predefined amount of time, clicking on an activatable icon, double clicking on an activatable icon, clicking from the right side on an activatable icon, clicking from the left side on an activatable icon, clicking from the bottom on an activatable icon, clicking from the top on an activatable icon, grasping an activatable icon the object, gesturing towards an activatable icon the object from the right, gesturing towards an activatable icon from the left, passing through an activatable icon from the left, pushing the object, clapping, waving over an activatable icon, performing a blast gesture, performing a tapping gesture, performing a clockwise or counter clockwise gesture over an activatable icon, sliding an icon, grasping an activatable icon with two fingers, and performing a click-drag-release motion.

The data associated with the identified object may be any one or more of visual data, audio data, or textual data. The data associated with the identified object may be an activatable icon. The activatable icon may be a 2D or 3D activatable icon. The activatable icon may be perceived by a user in a 3D space in front of the user.

The method of the invention may have two or more operational modes. The method may change the operational mode of the system upon identification of a predefined gesture. An operational mode may be specified by any one or more of the gestures to be identified, algorithms that are active on the gesture detection module; a resolution of images captured by the image sensor, and a capture rate of images captured by the image sensor, the level of details of the data to be presented, the activatable icons to be presented to the user, a source of the data to be presented, a level of details of the data to be presented, activatable icons to he displayed on the display device, an active on-line service.

The operational mode may be a mode selected from a mode of video recording of images by the image sensor upon identification of a predefined gesture; a mode of recording sounds by a microphone upon identification of a predefined gesture and to stop recording upon identification of another predefined gesture; a mode of continuously monitoring video or sound and following a detection of a predefined gesture, recording the video or sound starting from a pre-defined amount of time prior to identification of the gesture, and stopping the recording after identification of another predefined gesture, a mode of adding tags in a captured and real-time recorded video upon identification of a predefined gesture am mode of selecting an area in the field of view as captured by the camera, and copying the area to another location in the field of view and resizing it, a mode employing a tracker on a selected area in an image and is presenting the selected area in real-time in resized and relocated area on the display device, a mode of capturing an image upon identification of a predefined gesture.

The method of the invention may further comprise running a tracking algorithm that tracks the identified real world object and maintains the displayed associated visual data in a fixed position relative to the identified real world object.

An object recognition module may be employed to detect the predefined object only when the display device has level of motion below a predetermined threshold.

The method may further comprise providing feedback when a predefined gesture has been identified. The feedback may be, for example, visual feedback, audio feedback, haptic feedback, directional vibration, air tactile feedback, or ultrasonic feedback. The feedback may be a visual indication in a form selected from an activatable icon displayed on the display device, a change in an activatable icon displayed on the display device, a change in color of an activatable icon displayed on the display device, a change in size of an activatable icon displayed on the display device, animation of an activatable icon displayed on the display device, an indication light, an indicator moving on a display device, an indicator moving on the display device that appears on top of all other images or video appearing on the display device and the appearance of a glow around the predefined object. The feedback may be a vibration, a directional vibration indication, or an air tactile indication.

In the method of the invention, part of an activatable icon displayed on the display device may not presented where the predefined object is located, so that the predefined object appears to be on top of the activatable icon.

Activatable icons may be removed from the display device when the display device has a level of activity above a predefined threshold. The removed icons on the display device may be removed, for example, when the display device has a level of motion below the predefined threshold.

The method may be brought into an active mode when a predefined action is performed. The predefined action may be selected from bringing the predefined object into the field of view from below, when user place the predefined object in certain location or posse, such as pointing on the bottom right corner of the camera field of view or open his hand in the camera field of view, perform a predefined gesture such as moving hand from right to left across the field of view, when an activatable icon is displayed and the user performs a predefined gesture correlate to the activatable icon such as pointing on the activatable icon, or perform a waving gesture in the location where the activatable icon is presented, or sliding the floating activatable icon from one location to the other by perform a gesture in the 3D space where the activatable icon is perceived to be located, by touching the device, or tapping on the device if the device is provided with an accelerometer. As yet another example, the system may enter the active mode when the user passes a hand near the device if the device is provided with a proximity sensor, or ultrasonic sensor. The system may also be activated by a voice command, or when the user places the predefined object in a particular location in the field of view. As yet another example, the system may enter the active mode only when there is relevant data associated with the real world in the field of view of the user. When the system may indicate to the user when there is a relevant data to be presented, or when it is ready for interaction.

The method of the invention may further comprise attaching a visual indication to a real-world object indicating the existence in a memory of data correlated with the real-world object. The visual indication may be overlaid on an image of the real-world object. The visual may be selected from an activatable icon, a photo, and an image of an envelope.

The method of the invention may further comprise a calibration process to record one or more physical parameters of the predefined object. The calibration process may comprise any one or more steps selected from presenting on the display activatable icons in different locations in a 3D space, extracting physical features of the predefined object, and determining a correlation between dimensions of the predefined object and its distance from the camera. The calibration process may comprise a step of constructing a triangle having vertices at one of the image sensors and at a tip of the predefined object and having a side formed by a user's line of sight. The distance of the real world object from the camera may be estimated based on information extracted in the calibration.

The method may further comprise displaying a keyboard enabling text typing. The keyboard may be displayed upon detection of a predefined gesture, such as a gesture from right to left, presenting an open hand, presenting two open hands in a predefined region of the field of view of an image sensor. The keyboard may be displayed upon performing a click gesture in a 3D typing area or where a predefined activatable icon is perceived to be located.

The invention also provides a system comprising a device configured to execute the method of the invention.

The invention also provides a computer program comprising computer program code means for performing all the steps of the method of the invention when said program is run on a computer. The computer program may be embodied on a computer readable medium.

A user may interact with a visual image typically displayed through glasses. The user's view of reality is, thus, augmented by the information presented on the display. One issue with augmented reality devices is the manner in which the user interacts with and controls the device. Traditional control devices, e.g., a mouse, track ball, or touch screen, are difficult to use with augmented reality devices. Using gesture recognition in an augmented reality system is not trivial, because the user, and thus the augmented reality device, is constantly moving in real time.

The invention thus provides a computer program product containing instructions for causing a processor to perform a method comprising:

receiving, from an image sensor associated with an augmented reality device, image information associated with an environment;

displaying, on a display associated with the device, augmented information related to the environment;

recognizing, in the image information, a hand gesture by a user of the device;

correlating the hand gesture with the augmented information; and altering the displayed augmented information based on the correlating.

The augmented information may include at least one of information associated with objects in the environment; images associated with the environment; and distances associated with the environment.

The correlating may include determining a reference location in three dimensional space of at least a portion of the user's hand, and determining in at least one of the augmented information and the image information data associated with the reference location.

The altering may include changing the augmented information as a function of the data associated with the reference location.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
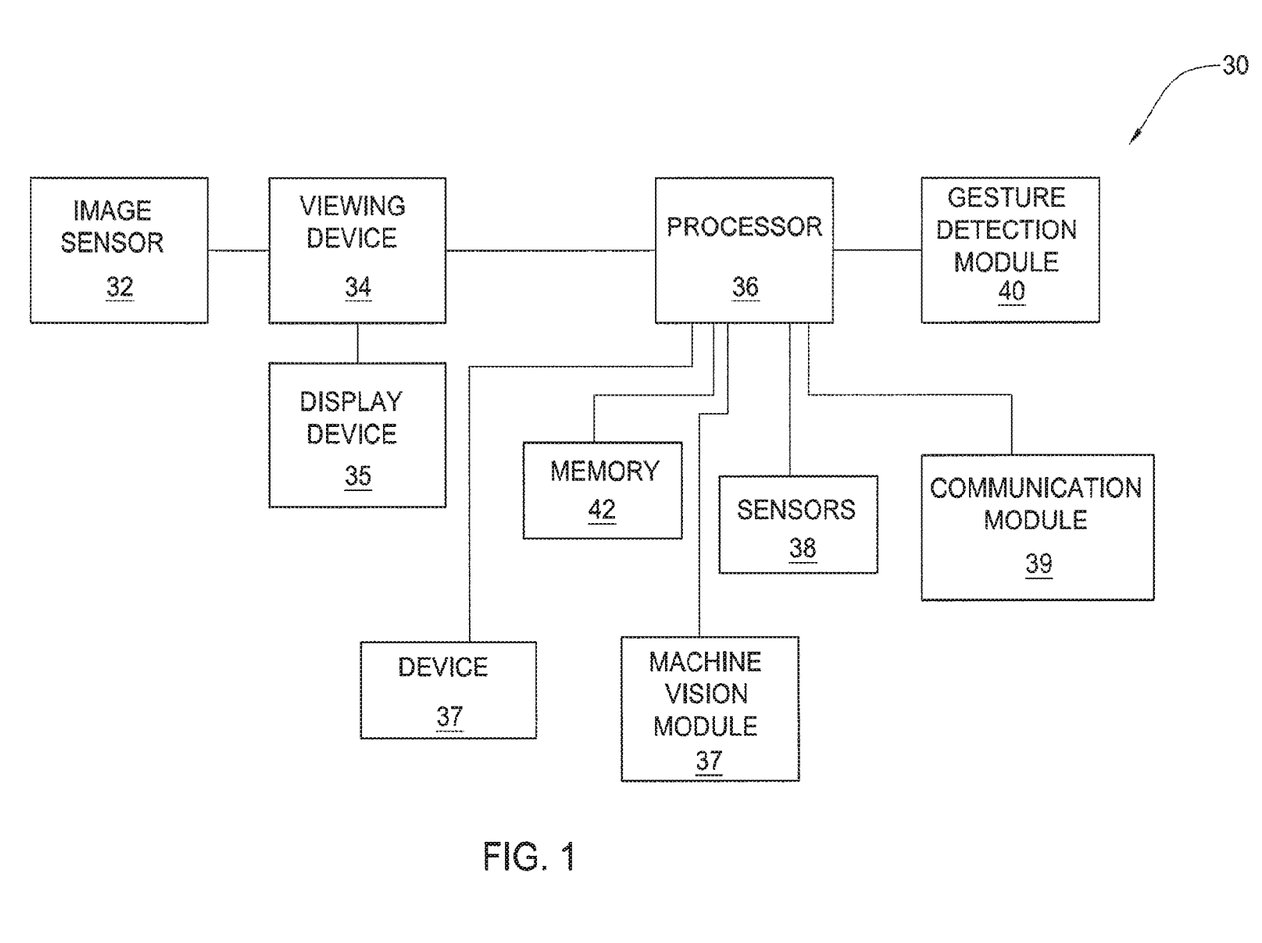
FIG. 1 shows schematically a system for augmented reality in accordance with one embodiment of the invention.

FIG. 1 shows schematically a system 30 for augmented reality in accordance with one embodiment of the invention.

The system 30 includes one or more image sensors 32 configured to obtain images of a real world scene. Any type of image sensor may be used in the system of the invention such as a camera alight sensor, an IR sensor, an ultrasonic sensor, a proximity sensor, a CMOS image sensor, a shortwave infrared (SWIR) image sensor or a reflectivity sensor.

The system 30 further includes a viewing device 34 having one or more display devices 35 that enable a user to see both the real world scene and external information, such as images, videos, or audio signals, superimposed upon the real world scene. Any type of display device that allows a user to both see the real world scene and the displayed data may be used in the system of the invention.

The display devices 35 may comprise, for example, a surface upon which visual material is presented to a user or one or more projectors that display images directly to the user's retina. A processor 36 obtains orientation and/or location data of the system 30 from one or more state sensors 38, that may be, for example, any one or more of an optical sensor, an accelerometer, GPS, a gyroscope, a solid state compasses, magnetic sensor, gravity sensor, and an RFID detector. The processor 36 may be, for example, a dedicated processor, a general purpose processor, a DSP (digital signaling processor) processor, a GPU (visual processing unit) processor, dedicated hardware, or a processor that can run on an external device. The system 30 may run as a software on the viewing device 34, or another device 37, such as Smartphone, that incorporates the other components of the system 30.

The processor 36 is configured to run a gesture detection module 40 that identifies in images of the real world scene obtained by the image sensor 32 one or more real world objects at which a predefined object is pointing. The real world objects may be, for example, a building or a billboard. Determination of the real world objects utilizes data provided by the state sensors 38. The predefined object be a user's finger or other object such as a stylus or wand.

When the processor 36 has identified a real world object at which the predefined object is pointing, the processor searches in a memory 42 for data associated with the identified object. The data may be, for example, visual data, audio data, or textual data. The visual data may be textual information relating to the identified object. The processor then displays the associated visual data associated with the identified object on the display of the viewing device. The memory 42 may be integral with the system 30 or may be remotely located and accessed over a communication network, such as the Internet. The system 30 may thus comprise a communication module 39 allowing the system 30 to communicate with a network, wireless network, cellular network, an external device such as another device 30, a mobile phone, tablet, or an Internet website and so on.

The data may be an activatable icon. As used herein, the term "activatable icon" refers to a region in an image or video associated with one or more messages or commands that are activated by a user interaction. The activatable icons may be, for example, a 2D or 3D visual element such as virtual buttons, a virtual keyboard or icon. Activatable icons are activated by means of one or more predefined objects that are recognizable by the system, and may be, for example, a stylus, one or more of a user's hands or a portion of a hand, one or more fingers or a portion of a finger such as a finger tip. Activation of one or more of the activatable icons by a predefined object results in the generation of a message or a command addressed to an operating system, one or more services, one or more applications, one or more devices, one or more remote applications, one or more remote services, or one or more remote devices.

The processor 36 may be configured to send a message or command to the device 37 or to a remote device, to an application running on the device, to a service running on the device 37, and an operating system running on the device, to a process running on the device, a software program running in the background and one or more services running on the device or, a process running in the device. The message or command may be sent over a communication network such as the Internet or a cellular phone network. The command may be, for example, a command to run an application on the device, a command to stop an application running on the device, a command to activate a service running on the device, a command to stop a service running on the device, or a command to send data to the processor 36 relating to a real world object identified in an image by the processor 36.

The command may be a command to the device 37 such as depressing a virtual key displayed on a display device of the device; rotating a selection carousel; switching between desktops, running on the device a predefined software application; turning off an application on the device; turning speakers on or off; turning volume up or down; locking the device, unlocking the device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, controlling interactive video or animated content, editing video or images, pointing at a map, zooming-in or out on a map or images, painting on an image, pushing an activatable icon away from the display device, grasping an activatable icon and pulling the activatable icon out form the display device, rotating an activatable icon, emulating touch commands on the device, performing one or more multi-touch commands, a touch gesture command, typing, clicking on a displayed video to pause or play, editing video or music commands, tagging a frame or capturing a frame from the video, cutting a subset of a video from a video, presenting an incoming message; answering an incoming call, silencing or rejecting an incoming call, opening an incoming reminder, presenting a notification received from a network community service; presenting a notification generated by the device, changing the device from a locked mode and activating a recent call application, changing the device from a locked mode and activating an online service application or browser, changing the device from a locked mode and activating an email application, changing the device from locked mode and activating an online service application or browser, changing the device from a locked mode and activating a calendar application, changing the device from a locked mode and activating a reminder application, changing the device from a locked mode and activating a predefined application set by a user, set by a manufacturer of the device, or set by a service operator, activating an activatable icon, selecting a menu item, moving a pointer on a display, manipulating a touch free mouse, activating an activatable icon on a display, and altering information on a display.

The communication module may be used to transmit a message that may be addressed, for example, to a remote device. The message may be, for example a command to a remote device. The command may be, for example a command to run an application on the remote device, a command to stop an application running on the remote device, a command to activate a service running on the remote device, a command to stop a service running on the remote device. The message may be a command to the remote device selected from depressing a virtual key displayed on a display device of the remote device; rotating a selection carousel; switching between desktops, running on the remote device a predefined software application; turning off an application on the remote device; turning speakers on or off; turning volume up or down; locking the remote device, unlocking the remote device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, pointing at a map, zooming-in or out on a map or images, painting on an image, grasping an activatable icon and pulling the activatable icon out form the display device, rotating an activatable icon, emulating touch commands on the remote device, performing one or more multi-touch commands, a touch gesture command, typing, clicking on a displayed video to pause or play, tagging a frame or capturing a frame from the video, presenting an incoming message; answering an incoming call, silencing or rejecting an incoming call, opening an incoming reminder; presenting a notification received from a network community service; presenting a notification generated by the remote device, opening a predefined application, changing the remote device from a locked mode and opening recent call application, changing the remote device from a locked mode and opening an online service application or browser, changing the remote device from a locked mode and opening an email application, changing the remote device from locked mode and opening an online service application or browser, changing the device from a locked mode and opening a calendar application, changing the device from a locked mode and opening a reminder application, changing device from a locked mode and opening a predefined application set by a user, set by a manufacturer of the remote device, or set by a service operator, activating an activatable icon, selecting a menu item, moving a pointer on a display, manipulating a touch free mouse, an activatable icon on a display, altering information on a display.

The message can be request for data associated with the identified object. The data request message may be addressed to an application, a service, a process, a thread running on the device, or from an application, a service, a process, or a thread running on an external device, from an online service.

In order to reduce CPU resources, an object recognition module to detect the predefined object can be employed only when the headset is not moving significantly as determined from information obtained by the state sensors.

Figure 2:
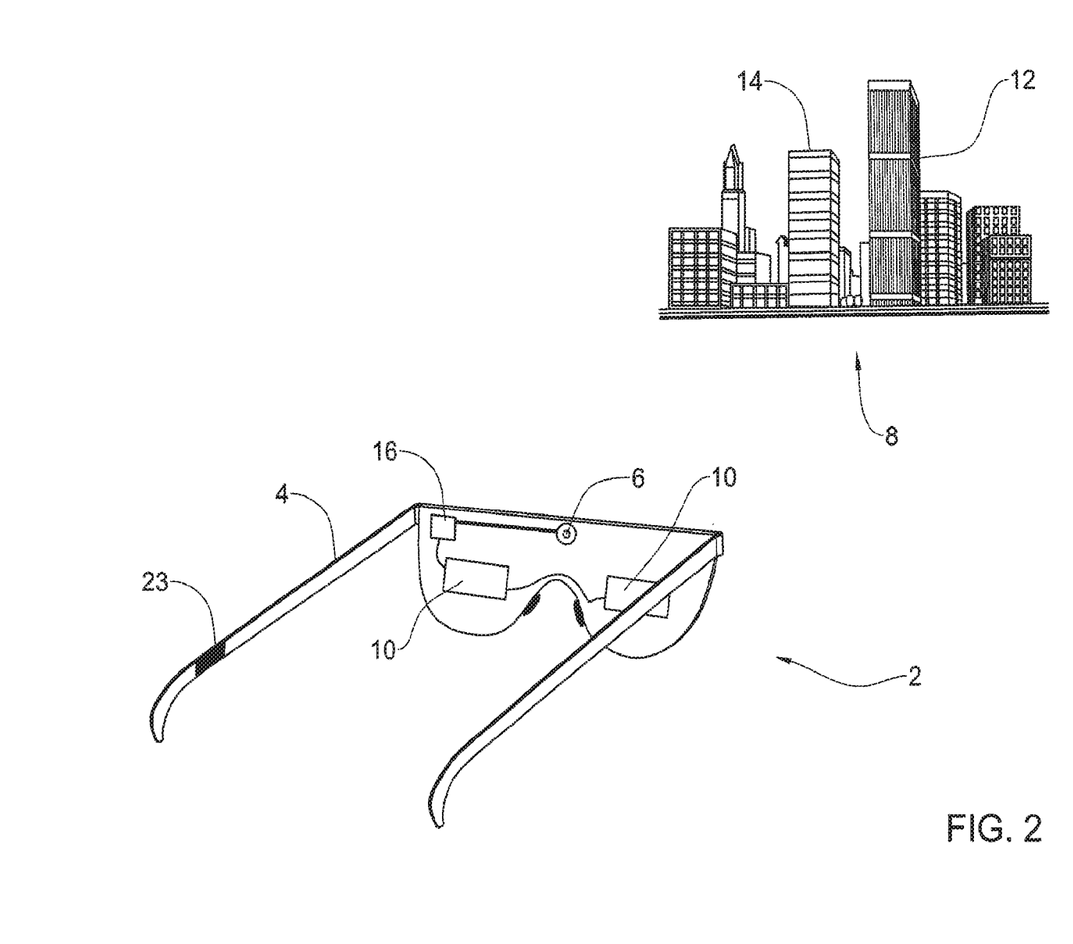
FIG. 2 shows a system for augmented reality comprising a set of goggles in accordance with one embodiment of the invention.

FIG. 2 shows a system 2 for augmented reality in accordance with one embodiment of the invention. The system 2 comprises a portable viewing device that may be for example, an interactive head-mounted eyepiece such as a pair of eyeglasses or goggles 4. The goggles 4 are provided with a image sensor 6 that obtains images of a real-world scene 8. The scene 8 may include, for example, one or more buildings 12, or one or more billboards 14. The goggles may be provided with one or more display devices 10 that are located in the goggles 4 so as to be positioned in front of a user's eyes when the goggles 4 are worn by the user. The display devices 10 may be, for example, see-through devices such as transparent LCD screens through which the real world scene is viewed, together with presenting external data. The system 2 further comprises a processor 16 that is configured to identify in images captured by the image sensors 6, a predefined object performs a gesture or pointing at a real world object in the real world scene 8 or activatable icons displayed to the user. The system 2 also includes one or more location and/or orientation sensors 23 such as GPS, an accelerometer, a gyroscope, a solid state compasses, magnetic sensor, or a gravity sensor.

Figure 5A:
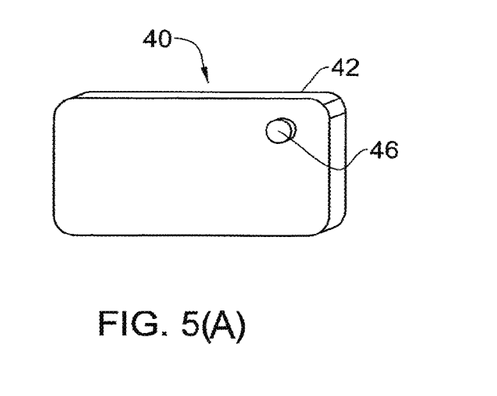
FIG. 5a shows a front view of a communication device of a system for augmented reality integral with a communication device in accordance with another embodiment of the invention.
Figure 5B:
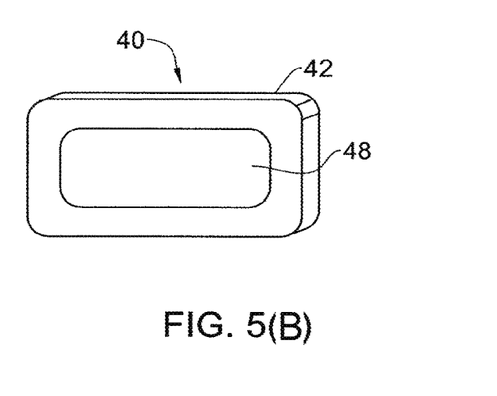
FIG. 5b shows a rear view of the communication device of the system.
Figure 6A:
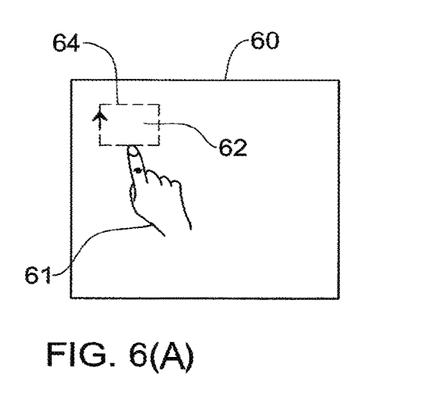
FIG. 6a shows a diagram of designating an area in the field of view of an image sensor by the user performing a gesture of "drawing" the contour of the area.
Figure 6B:
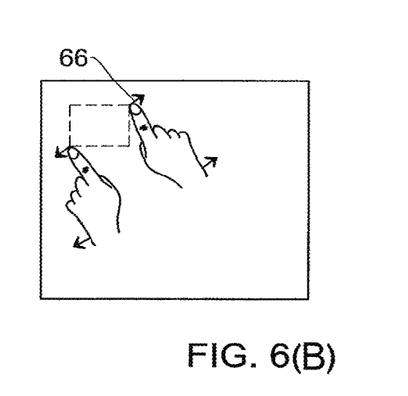
FIG. 6b shows resizing the selected area by performing a second gesture.
Figure 6C:
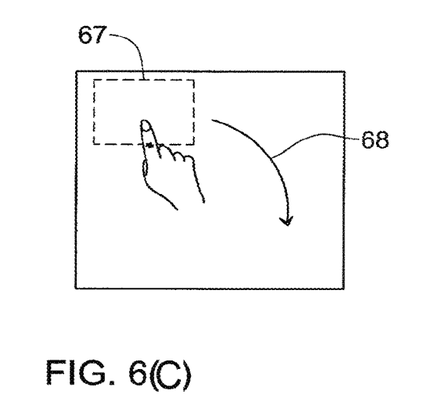
FIG. 6c shows the area after resizing.
Figure 6D:
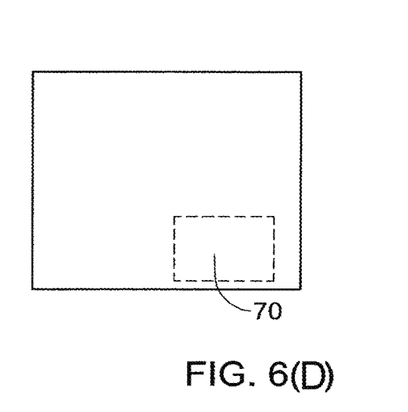
FIG. 6d shows the area after being dragged to a new location in the field of view.

FIG. 5 shows a system 40 for augmented reality in accordance with another embodiment of the invention. The system 40 is integrated into a mobile communication device 42 such as a mobile phone, tablet, or camera. A from view of the communication device 42 is shown in FIG. 5a, and a rear view of the communication device 42 is shown in FIG. 5b. The communication device 42 is provided with an image sensors 46 on its rear surface, opposite to the display device, that obtains images of a real-world scene. The communication device 42 is also provided with a display device 48 on its front surface that is positioned in front of a user when the camera 46 is directed towards a real world scene. The display device 48 may be for example, a LCD screen that presents to the user images of a real world scene obtained by the camera 6, together with visual data, as explained below. The 40 utilizes the camera 46, the display device 48, and the processor of the communication 42, and further comprises one or more state sensors, contained within the housing of the communication device 42 which are not seen in FIG. 5. The processor is configured to identify in images captured by the image sensors 46 a predefined object pointing at a real world object in the real world scene.

Figure 3A:
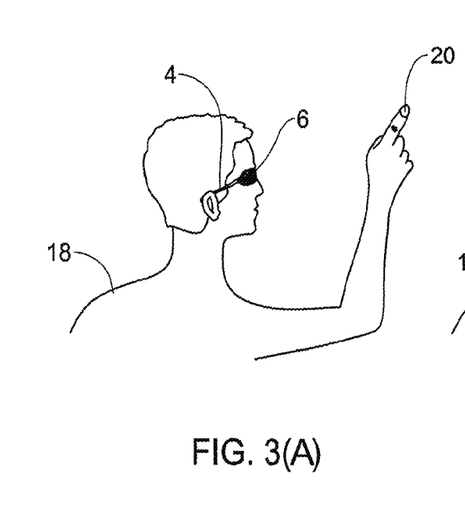
FIGS. 3a and 3b show diagrams of examples of the system of FIG. 2 in use.
Figure 3B:
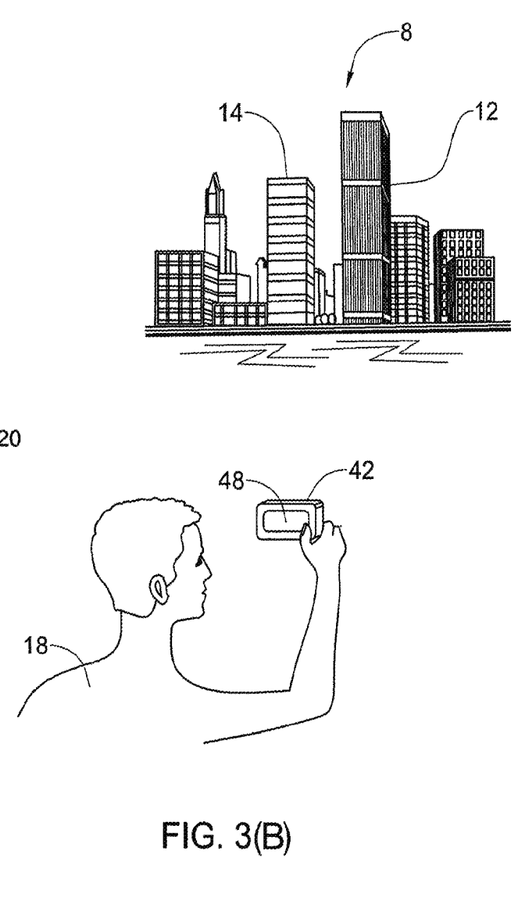

FIG. 3a shows the system 2 in use. The goggles 4 are placed over the eyes of a user 18. The user faces the real world scene 8 and thus views the scene 8. FIG. 3b shows the system 40 in use. The user 18 holds the communication device 42 with the image sensors 46 facing the real world scene 8 and the display device 48 facing the user.

Figure 4A:
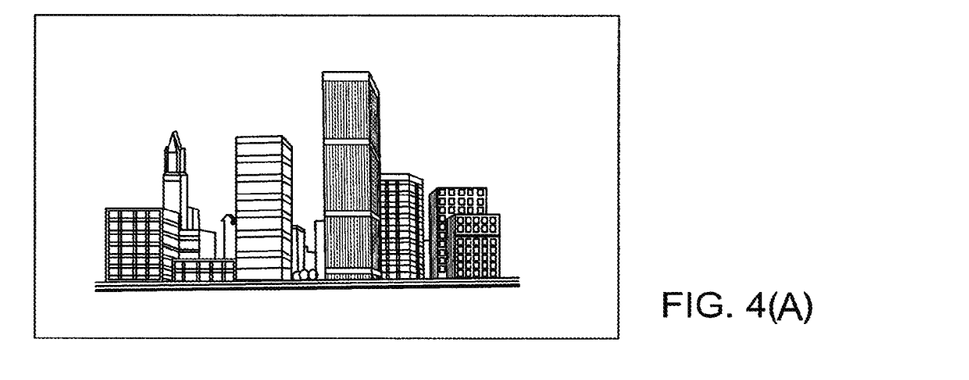
FIG. 4a shows a view of a real-world scene displayed on a display device of the system of FIG. 2.

The system 2 or 40 now executes the following process. The view of the scene 8 that the user would see when using the system 2 or 40 is displayed on the display device. FIG. 4a shows the view of the scene 8 that the user would see when using the system 2 or 40 to view the real world scene 8. The processor 36 analyzes images obtained by the image sensors to determine when a predefined object in images captured by the image sensors is performing a predefined gesture in relation to a real world object in the real world scene 8.

The viewing device 34, such as the goggles 4 or the communication device 42 is often not stable in use, due to movement of the user as occurs during walking, or movement the user's head or hand. In this situation, the signal generated by the sensors 38 may be noisy and inaccurate. In this case, the machine vision module 37 runs a tracking algorithm that tracks the identified real world object and maintains the displayed associated visual data in a fixed position relative to the identified real world object.

The predefined gesture relating to a real world object or to an activatable icon, may be, for example, pointing at the real world object or an activatable icon, or performing a swiping gesture over the real world object or an activatable icon. The activatable icon may or may not be correlated to a real world objects.

Other possible predefined gestures include a swiping motion, a pinching motion of two fingers such as with the fore finger and thumb or the middle finger and thumb, pointing, a left to right gesture, a right to left gesture, an upwards gesture, a downwards gesture, a pushing gesture, opening a clenched fist, opening a clenched fist and moving towards the image sensor, a tapping gesture, a waving gesture, a clapping gesture, a reverse clapping gesture, closing a hand into a fist, a pinching gesture, a reverse pinching gesture, a gesture of splaying fingers on a hand, a reverse gesture of splaying fingers on a hand, pointing at an activatable icon, or at a real world object, pointing at an activatable icon or a real world object for a predefined amount of time, clicking on an activatable icon or real world object, double clicking on an activatable icon or real world object, clicking with a forefinger on an activatable icon or real world object, clicking with the middle finger on an activatable icon or real world object, clicking from the bottom on an activatable icon or real world object, clicking from the top on an activatable icon, grasping an activatable icon or real world object gesturing towards an activatable icon or real world object from the right, gesturing towards an activatable icon or real world object from the left, passing through an activatable icon or real world object from the left, pushing the activatable icon or real world object, clapping or waving over an activatable icon or real world object, performing a blast gesture, performing a tapping gesture, performing a clockwise or counter clockwise gesture over an activatable icon or real world object, sliding an activatable icon or real world object, grasping an activatable icon or real world object with two fingers, or performing a click-drag-release motion.

The predefined object may be, for example, a user hand, a part of a user's hand, such as the user's finger 20 or parts of two different hands. Alternatively, the predefined object may be a stylus or wand.

When the processor 16 determines that a predefined gesture has been performed, this may be indicated to the user by any type of feedback, such as visual feedback, audio feedback, haptic feedback, directional vibration, air tactile feedback, or ultrasonic feedback. The feedback may be a visual indication in a form selected from an activatable icon displayed on a display device, a change in an activatable icon on a display device, a change in color of an activatable icon on a display device, a change in size of an activatable icon, animation of an activatable icon, an indication light, an indicator moving on a display device, a vibration, a directional vibration indication, an air tactile indication. The indication may be provided by an indicator moving on a display device that appears on top of all other images or video appearing the display device. Visual feedback may be the appearance of a glow around the predefined object when a system recognizes the predefined object.

The gesture detection module 40 may use any method for detecting the predefined objects in images obtained by the image sensor 32. For example, the gesture detection module may detect the predefined object as disclosed in WO2005/091125 or WO 2010/086866.

Figure 4B:
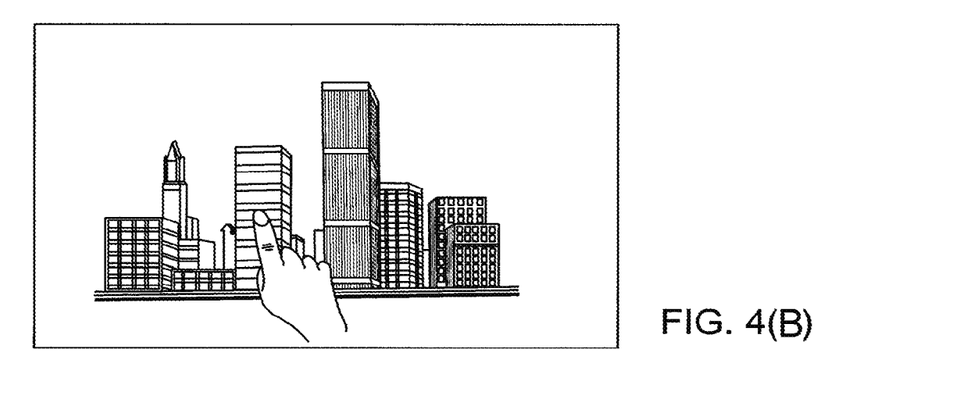
FIG. 4b shows the view of FIG. 4a with the user's finger is pointing to an object in the view.
Figure 4C:
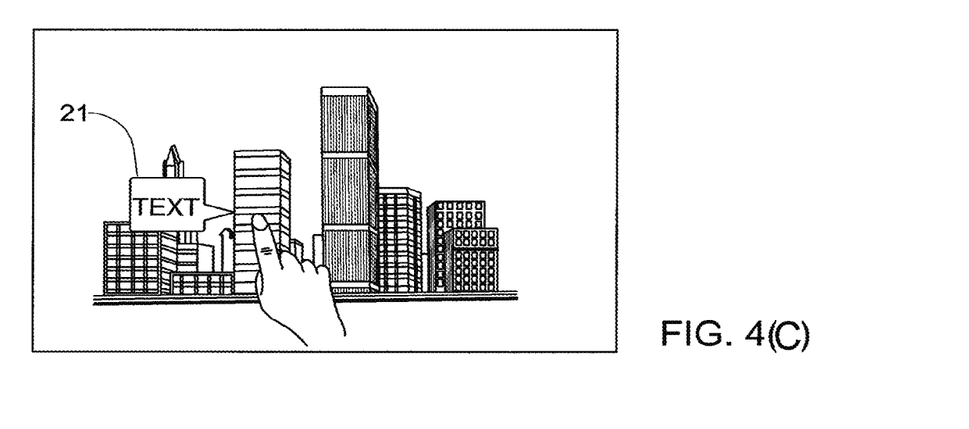
FIG. 4c shows visual text relating to the object at which the use's finger is pointing overlaid on the view of FIG. 4b.

The processor 16 is further configured to determine the real world object in the scene 8 towards which the predefined gesture was performed. Thus, for example, in the image shown in FIG. 4b, the processor 16 would determine that the user's finger 20 is pointing at the billboard 14 by determining the fingertip location (X,Y) in the image and combining this information with the location of the user and the orientation of the goggles 4 from the state sensors 21. The real world object is thus identified by the processor without presenting to the user a cursor or other marker to indicate the real world object that the user wishes to select, enabling a direct pointing on a real world object to start an interaction. The processor 16 searches in a memory, which may be integral with the processor 16 or may be remotely located, for data relating to the real-world object to which the user's finger 20 is pointing. For example, the memory may have stored data relating to the billboard 14. When the user points to an object in the scene 8 whose data is stored in the memory or is extracted from a remote server such as an Internet site, the data is displayed on the display device 10 superimposed on the user's view of the scene. Thus, when the user points to the billboard 14 (FIG. 3), visual data 21 relating to the billboard 14 is displayed on the display device 10, as shown in FIG. 4*c*.

The visual data 21 may be static or animated. The visual data 21 may include one or more an activatable icons, such that when a predefined gesture is performed relative to one of the activatable icons, a command associated with the activatable icon is executed. The command may be, for example, to display specific visual material relating to the selected real world object. The activatable icons may be 2D or 3D activatable icons and may be presented to the user so that the user perceives the icon in front of him in a 3D space. As used herein, an activatable icon is a region in a 2D or 3D image or video associated with one or more messages activated by user interaction. The activatable icons may be, for example, a 2D or 3D visual element. The activatable icons may be virtual buttons, a virtual keyboard, a 2D or 3D activatable icon, a region in an image or a video. An activatable icon may consist of two or more activatable icons.

The processor may not present part of the activatable icon where the predefined object is located, so that the predefined object appears to be on top of the activatable icon. The activatable icons may be removed when the user rapidly moves his head and then returned when the head motion is below a predefined motion speed.

The system 2 may have two or more operational modes and the processor 16 may be configured to identify one or more predefined gestures to change between the operational modes. Thus, a gesture may be used to turn the system on or off, select the source of the visual material to be presented, select the level of details of the visual material to be presented, select the buttons or activatable icons to be presented to the user, or activate an online service, such as an online service related to a selected real world object. Yet another mode of operation may be to start video recording of images by the image sensor and/or recording of sounds by a microphone upon identification of a predefined gesture and to stop recording upon identification of another predefined gesture. Yet another mode of operation is continuously monitoring video and/or sound, but following a detection of a predefined gesture, the video/sound is recorded starting, from a predetermined amount of time prior to identification of the gesture, and stopping the recording after identification of another predefined gesture. The predetermined time may be defined by the user. Yet another mode of operation is adding tags in a captured and real-time recorded video upon identification of a predefined gesture.

Yet another mode of operation is shown in FIG. 6. In FIG. 6*a*, an area 62 in the field of view 60 as captured by the image sensor is designated by the user performing a gesture of "drawing" the contour of the area, by phantom lines in FIG. 6. The selected area is then resized by the user performing a second gesture, such as separating two fingers or bringing two fingers closer together as indicated by the arrows 66 in FIG. 6*b*, until the selected area attains the desired size (67 in FIG. 6*e*). The area 67 is then dragged to a new location in the field of view (FIG. 6*d*) and copied in the new location in the field of view. The system then employs a tracker on the selected area and the selected area is presented in real-time in the resized and relocated area set by the user on the display device.

In order to minimize CPU resources, for each displayed activatable icon, a region of images containing a displayed activatable icon bounding box around a displayed activatable icon may be defined that remains fixed. The system employs a machine vision tracker to track this bounding box. The distance between the locations of the bounding boxes in two frames of a video sequence is less than a predefined distance, as determined using a video tracker, and the correlation value of the tracker of the bounding box is below a predefined value.

When the system is in an operational mode in which only activatable icons may be activated, and real world objects cannot be activated, CPU can be minimized by searching for the predefined object only in the vicinity of each displayed activatable icon. In order to reduce CPU even further, the objection recognition module is not activated all the time but only when the headset is not moving significantly as determined from information obtained by a state sensors.

A user may choose different filters to screen data correlated with real-world objects, such as a filter "display data generated only by friends", or display data from registered sources, or data generated in the last three months.

The system 2 may have a stand-by mode in which the power consumption by the system 2 is minimal. The active mode may be different from the stand-by mode, for example, in the number of video frames per second that are being analyzed by the system, the resolution of images that are being analyzed, the portion of the image frame that is being analyzed, and/or the detection modules that are activated. The system 2 can be brought to the active mode by any technique. For example, the system 2 may be brought to the active mode by bringing the predefined object into the field of view from below, when user place the predefined object in certain location or posse, such as pointing on the bottom right corner of the camera field of view or open his hand in the camera field of view, perform a predefined gesture such as moving the hand from right to left across the field of view, when an activatable icon is displayed and the user performs a predefined gesture correlate to the activatable icon such as pointing on the activatable icon, or perform a waving gesture in the location where the activatable icon is presented, or sliding the floating activatable icon from one location to the other by perform a gesture in the 3D space where the activatable icon is perceived to be located, by touching the device, or tapping on the device if the device is provided with an accelerometer. As yet another example, the system may enter the active mode when the user passes a hand near the device if the device is provided with a proximity sensor, or ultrasonic sensor. The system may also be activated by a voice command, or when the user places the predefined object in a particular location in the field of view. As yet another example, the system may enter the active mode only when there is relevant data associated with the real world in the field of view of the user. When the system may indicate to the user when there is a relevant data to be presented, or when it is ready for interaction.

A visual indication may be attached to a real-world object to let the user know that there is data correlated with the real-world object.

Indication of relevant data may be overlaid on the location of the real-world object as a small visual indication such as an activatable icon of "i" may indicate information, and a logo of "photos" may indicate images related to the real-world object, or a logo of "envelop" indicates a message that was left by a friend or other user correlated to the real-world object. When the user performs a predefined gesture correlated to the activatable icon, the data may be presented.

The system 2 may be configured to undergo a calibration process to record various physical parameters of the predefined object so as to facilitate identification of the predefined object in images obtained by the camera by the processor 2. This may be done, for example, by presenting to the user on the display activatable icons in different locations in the 3D space, and extracting physical features of the predefined object such as its size or orientation of the predefined object, and determining a correlation between the dimensions of the predefined object and its distance from the camera. The calibration may involve calculating the triangular of camera, the user's line of sight and the tip of the predefined object to determine the user is pointing at. The accuracy is improved by estimating the distance of the real world object from the camera based on information extracted in the calibration.

The processor may be configured to identify in images obtained by the camera of the real world scene by another user of the system of the invention. The identification of another user in the real world scene may be performed, for example, by informing a remote server of the locations of the devices in a particular geographical area. The locations of the other devices can be sent to all of the devices in the geographical area.

When a communication link exists between two systems of the invention, the two systems may be used for game playing. The other user may be represented to as an avatar with whom the user can interact by gestures such as send a message to the other user such as "like".

The processor may be configured display a keyboard that enables text typing with one or more fingers or hands. Display of the keyboard may be initiated upon detection of a predefined gesture such as a gesture from right to left, or by the using presenting an open hand, or two open hands in a predefined region of the field of view of the camera, such as the bottom part of the field of view. Yet another way to initiate the display of the keyboard is when the user performs a click gesture in the 3D space where the typing area or an activatable icon is perceived to be located. The keyboard may be used, for example, in order to, write a note, conduct a search or to communicate with online services (such as Skype or twitter) by typing on virtual keyboard. The system may not present part of the keyboard where the predefined object is located, so that the predefined object appears to be on top of the keyboard to create the illusion that the predefined object such as a user's hand appears to be "over" the keyboard.

When the system is in a typing mode, an animated hand may be presented on the keyboard whose position is correlated with the user's hands and fingers. The fingertips of the animated hands may be located above a virtual keystroke at the location where the character of the keystroke is seen. The keyboard and the animated hands are preferably opaque, so that the user is unable see the background behind the keyboard. This tends to make the keyboard clearer to the user.

The invention claimed is:

1. An augmented reality device, comprising:
   at least one processor configured to:
      receive, from an image sensor, video frames of image information associated with a real world scene;
      detect, in the image information, a predefined hand gesture performed by a user;
      designate an area of selected image information associated with a real-world object at a first location in the video frames, wherein the selected image information is associated with the real world scene that does not include the user's hand, the designated area being associated with the detected predefined hand gesture;
      copy the designated area of the selected image information to a second location in a field of view of the user; and
      track the selected image information associated with the real world scene to present a real-time view of the real-world object in the selected information in the second location.

2. The augmented reality device of claim 1, wherein the predefined hand gesture includes drawing a contour of the designated area.

3. The augmented reality device of claim 1, wherein the at least one processor is further configured to resize the designated area.

4. The augmented reality device of claim 3, wherein the second predefined hand gesture comprises separating two fingers, or bringing two fingers closer together.

5. The augmented reality device of claim 1, wherein the at least one processor is further configured to zoom in or out in association with a second predefined hand gesture detected in the image information.

6. The augmented reality device of claim 3, wherein the at least one processor is further configured to zoom in or out in association with the resize of the designated area.

7. The augmented reality device of claim 1, wherein the at least one processor is further configured to capture a frame from the video frames of image information in association with a second predefined hand gesture detected in the image information.

8. The augmented reality device of claim 1, wherein the second location is defined by the user.

9. The augmented reality device of claim 8, wherein the second location is defined by the user performing a dragging gesture associated with the designated area.

10. The augmented reality device of claim 1, wherein the at least one processor is further configured to employ a tracker on the selected image information to present the real-time view of the real-world object in the selected information in a resized area in the field of view of the user.

11. A method of operating an augmented reality device, the method comprising:
   receiving, by at least one processor from an image sensor, video frames of image information associated with a real world scene;
   detecting, by the at least one processor in the image information, a predefined hand gesture performed by a user;
   designating, by the at least one processor, an area of selected image information associated with a real-world object at a first location in the video frames, wherein the selected image information is associated with the real world scene that does not include the user's hand, the designated area being associated with the detected predefined hand gesture;
   copy the designated area of the selected image information to a second location in a field of view of the user; and
   track the selected image information associated with the real world scene to present a real-time view of the real-world object in the selected information in the second location.

12. The method of claim 11, wherein the predefined hand gesture includes drawing a contour of the designated area.

13. The method of claim 11, wherein the at least one processor is further configured to resize the designated area.

14. The method of claim 13, wherein the second predefined hand gesture comprises separating two fingers, or bringing two fingers closer together.

15. The method of claim 11, further comprising zooming in or out in association with a second predefined hand gesture detected in the image information.

16. The method of claim 11, further comprising capturing a frame from the image information in association with a second predefined hand gesture detected in the image information.

17. The method of claim 11, further comprising employing a tracker on the selected area to present the real-time view of the real-world object in the selected information in a resized area in the field of view of the user.

18. A non-transitory computer-readable medium storing instructions that, when executed, cause at least one processor to perform a method of operating an augmented reality device, the method comprising:

receiving, from an image sensor, video frames of image information associated with a real world scene;

detecting, in the image information, a predefined hand gesture performed by a user;

designating an area of selected image information associated with a real-world object at a first location in the video frames, wherein the selected image information is associated with the real world scene that does not include the user's hand, the designated area being associated with the detected predefined hand gesture;

copy the designated area of the selected image information to a second location in a field of view of the user; and tracking the selected image information associated with the real world scene to present a real-time view of the real-world object in the selected information in the second location.

* * * * *